M. NIELSEN.
GAGE.
APPLICATION FILED OCT. 12, 1910.
1,007,229.
Patented Oct. 31, 1911.
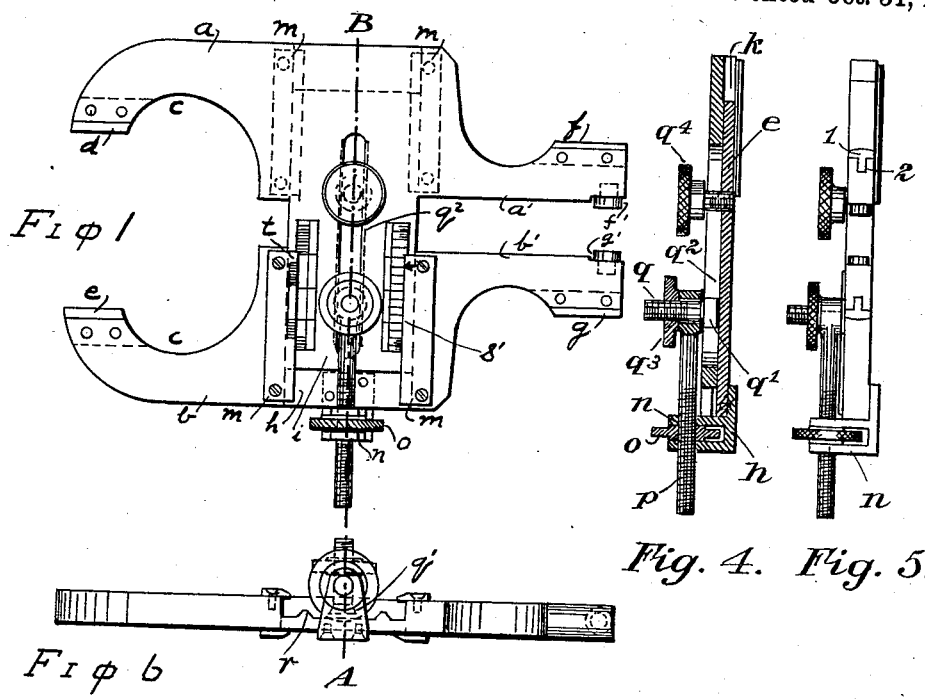
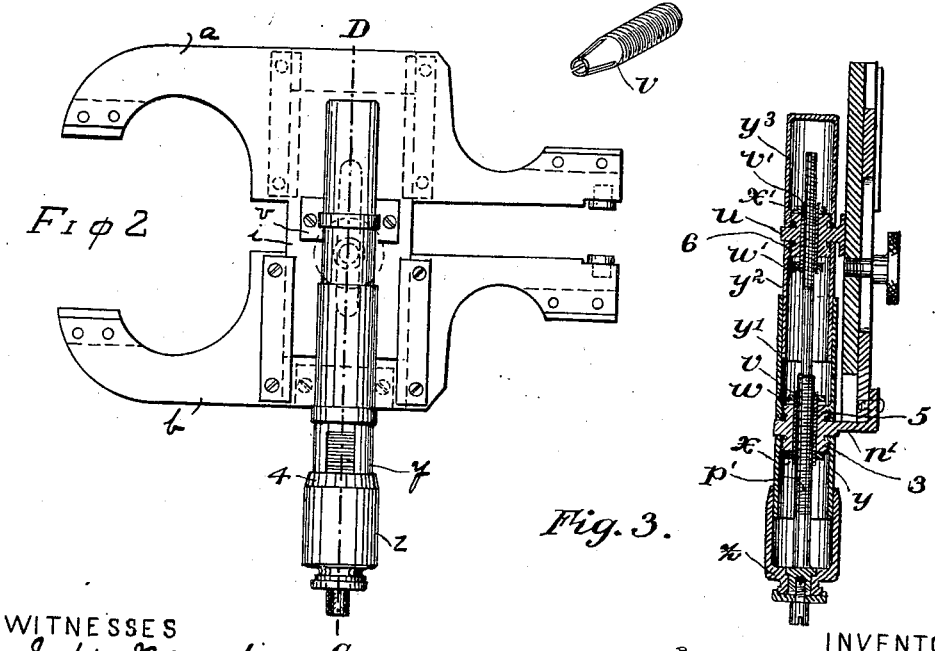
WITNESSES
INVENTOR
Marius Nielsen
BY J. H. Moek
ATTORNEY

UNITED STATES PATENT OFFICE.

MARIUS NIELSEN, OF PORTLAND, OREGON.

GAGE.

1,007,229.  Specification of Letters Patent.  Patented Oct. 31, 1911.

Application filed October 12, 1910.  Serial No. 586,811.

*To all whom it may concern:*

Be it known that I, MARIUS NIELSEN, who have declared my intention to become a citizen of the United States, residing at Portland, in the county of Multnomah and State of Oregon, have invented certain new and useful Improvements in Gages, of which the following is a specification.

This invention relates to improvements in measuring gages and has for its object to provide a gage for measuring large and small external diameters or distances and also for measuring internal distances and which is provided with both the common and vernier scales for indicating minute distances. I attain these objects by the mechanism illustrated in the accompanying drawing, in which—

Figure 1, is a plan view of my improved gage. Fig. 2, is a plan of a modification thereof. Fig. 3, is a sectional view on the line C—D of Fig. 2. Fig. 4, is a sectional view on the line A—B of Fig. 1. Fig. 5, is an end view of the gage. Fig. 6, is an edge view of same. Fig. 7 shows a screw threaded sleeve having tapering split ends.

Similar characters refer to similar parts throughout the several views.

In the drawing $a$ represents one member of my gage and $b$ is the other, each being provided with an oppositely disposed recess $c$, with the extremities of the members approaching each other.

$d$ and $e$ are shoes forming a facing on what may be termed the front extremities, or outside caliper, $a$ and $b$ respectively, each shoe being provided with a tongue 1 for engagement in a groove 2 in its respective member, where it is secured. Similar shoes $f$ and $g$ are secured in a similar manner upon the exterior faces of the rear extremities, or inside caliper; and upon the faces $a'$ and $b'$ respectively are shoes $f'$ and $g'$. These shoes may be omitted if desired. The caliper $f'$—$g'$ is for measuring distances too small to be measured by the caliper $d$—$e$.

In the upper face of the member $b$ is formed the recess or groove $h$, adapted to receive the correspondingly formed projection $i$ of the member $a$. Similarly, in the lower face of member $a$ is formed the recess $k$, which is adapted to receive the extended plate $l$ of the member $b$. Plates $m$ are secured over the edges of each of the extended portions $i$ and $l$ so as to hold them in place but allowing of a free lateral movement. At the lower side of the member $b$ is secured the bi-furcated bracket $n$, in which the thumb-nut $o$ operates. The screw-bolt $p$ is connected to the extension $i$, by means of the sliding bolt $q$. This bolt has a rectangular head, with divergent sides $q'$, which snugly fit in the correspondingly divergent slot $q^2$. When the thumb-nut $q^3$ is tightened it prevents any movement of the bolt $q$ along the slot $q^2$; and when the thumb-nut $o$ is turned on the bolt $p$, the members $a$ and $b$ will be moved laterally, relative to each other. The thumb-screw $q^4$, when tightened, binds the two members together and prevents any relative movement. To facilitate a steady, easy movement of the parts, ribs $r$ are formed in the face of the groove $h$, to fit snugly in correspondingly formed grooves in the face of the recess $k$. Upon the face of the projection from the member $a$ is a scale graduated to show sixty-four spaces to the inch; and at the opposite side of the extended portion $i$, is a vernier system $t$.

In Figs. 2 and 3 is shown a micrometer attachment, or operative mechanism. In this form the bracket $n'$ is formed in a single piece, and is made to receive the sleeve $v$, which is internally screw-threaded to receive the right-hand threads of the bolt $p'$. Upon the member $i$ is secured a standard or bracket $u$, in which is arranged the sleeve $v'$, which sleeve is internally screw-threaded to receive the left-hand screw-threads of the extended portion of the bolt $p'$. The sleeves $v$ and $v'$ each have a split end, the external portion being tapered and screw-threaded. The thumb-nuts $w$ and $w'$, when turned upon their respective sleeves, will cause them to tighten on the bolt $p'$, so as to compensate for wear. The thumb-nuts $x$ and $x'$ are adapted to tighten against their respective brackets $n'$ and $u$, to hold the members of the gage in any desired position, with reference to each other. Upon a boss 3 of the bracket $n'$ is secured the cylinder $y$, which is graduated, and, together with the graduation 4 of the cap $z$, which is rigidly secured to the bolt $p'$, forms a micrometer system of measurement. To a boss 5 on the opposite side of the bracket $n'$ is secured the sleeve $y'$ within which telescopes the sleeve $y^2$, which is similarly secured upon a boss 6 of the bracket $u$; and to the opposite side of the bracket $u$, is secured the sleeve $y^3$. Said sleeves $y'$, $y^2$ and $y^3$ cover and protect the mechanism within.

To facilitate the assembling of the parts, the portion of the bolt $p'$ which engages in the bracket $u$, is formed of smaller diameter than the remainder, so that it may readily pass through the bracket $n'$.

By the arrangement thus described, any rotation of the cap $z$, turning with it the bolt $p'$, will cause a double relative movement between the members $a$ and $b$. When the bolt is rotated in the direction of the arrow the members will move toward each other; and when it is rotated in the opposite direction, they will move away from each other.

Having thus described my invention, what I claim, is—

1. A measuring instrument comprising two members, each having a transverse groove at its central portion, the grooves being out of registration when the parts are closed, a projection from the inner edge of each member adapted to fit in the groove of the other, one end of said members being adapted to encompass external surfaces while the other is adapted to measure internal distances and mechanism for moving one member to and from the other.

2. A measuring instrument comprising two members each having a transverse groove at its central portion, the grooves being out of registration when the parts are closed,—a projection from the inner edge of each member adapted to fit the groove of the other,—means retaining said projections in their respective grooves,—a transverse connecting rod a bracket secured upon each member adapted to receive said rod,— means for adjusting said connecting rod whereby the members may be adjusted relatively to each other, said members being adapted at one end for encompassing external surfaces while the other is adapted to measure internal distances.

3. A micrometer caliper comprising two members, each having a transverse groove at its central portion, the grooves being out of registration when the parts are closed, a projection from the inner edge of each member adapted to fit the groove of the other, means retaining said projections in their respective grooves, a bracket secured upon the face of one member and a bracket secured to the external edge of the other member, each of which is provided with an aperture carrying a sleeve which is split at one end and one of which has an internal right-hand screw-thread, while the other has an internal left-hand screw-thread, a bolt extending through said sleeves and provided with corresponding screw-threads, whereby its rotation will cause a lateral movement of each member with reference to the other, thumb-nuts for tightening the sleeves on the bolt, lock-nuts for securing the members at any desired point and a cap bearing a micrometer index secured upon said bolt, for indicating any relative change in the position of the members.

4. A measuring instrument comprising two members each having a transverse groove at its central portion, the grooves being out of registration when the parts are closed,—a projection from the inner edge of each member adapted to fit the groove of the other,—one end of said members being adapted to encompass large objects while the other is adapted to encompass small objects, and the external sides of the members being reduced at the last mentioned end, for measuring internal distances, each of the measuring faces being provided with a removable plate.

In testimony whereof I affix my signature in presence of two witnesses.

MARIUS NIELSEN.

Witnesses:
J. H. MORTON,
M. G. GRIFFIN.

---

Copies of this patent may be obtained for five cents each, by addressing the "Commissioner of Patents, Washington, D. C."